United States Patent [19]

Willis et al.

[11] Patent Number: 5,259,723
[45] Date of Patent: Nov. 9, 1993

[54] FEEDING DEVICE FOR DOWN HOLE TUBULARS

[75] Inventors: Clyde A. Willis; Gary T. Oatman, both of Wichita Falls, Tex.

[73] Assignee: W-N Apache Corporation, Wichita Falls, Tex.

[21] Appl. No.: 731,077

[22] Filed: Jul. 16, 1991

[51] Int. Cl.$^5$ .............................................. E21B 19/15
[52] U.S. Cl. ........................ 414/746.4; 198/463.6; 198/532
[58] Field of Search .................. 198/463.6, 532; 414/746.4

[56] References Cited

U.S. PATENT DOCUMENTS

| | | |
|---|---|---|
| 1,417,096 | 5/1922 | Mueller . |
| 2,763,236 | 9/1956 | Cummings .................. 198/463.6 X |
| 2,999,605 | 9/1961 | De Jarnett . |
| 3,054,514 | 9/1962 | Riley . |
| 3,515,289 | 6/1970 | Schaller et al. . |
| 3,630,392 | 12/1971 | Cintract . |
| 4,051,956 | 10/1977 | Teague ........................... 414/746.4 |
| 4,067,453 | 1/1978 | Moller . |
| 4,533,055 | 8/1985 | Haney ........................... 198/463.6 X |

FOREIGN PATENT DOCUMENTS

2721342A1 11/1978 Fed. Rep. of Germany .
1009948 4/1983 U.S.S.R. ........................... 414/746.4

OTHER PUBLICATIONS

Patent Application Ser. No. 06/181,345, filed Aug. 26, 1980, entitled "Transfer Shoulder for Down-Hole Tubulars", inventors Clyde A. Willis and Howard G. Best.

*Primary Examiner*—Michael S. Huppert
*Assistant Examiner*—Janice Krizek
*Attorney, Agent, or Firm*—Willian Brinks Olds Hofer Gilson & Lione

[57] ABSTRACT

A feeding device for down hole tubulars includes a frame which defines a support surface. First and second stops are arranged to reciprocate in stop guides between an upper position, in which the stops interrupt movement of a tubular, and a lower position in which the stops allow movement of the tubular. The stop guides are moveable relative to one another to adjust the separation between the stops as appropriate for tubulars of different diameters. A tilting actuator arm cycles the stops between upper and lower positions to control the feeding of tubulars along the support surface.

7 Claims, 7 Drawing Sheets

FEEDING DEVICE FOR DOWN HOLE TUBULARS

BACKGROUND OF THE INVENTION

This invention relates to a device for controlling the movement of down hole tubulars such as drill pipe, collars, casing and production tubulars, and is particularly useful in automating the movement of down hole tubulars between the centerline of a borehole and on-site tubular storage facilities.

Moving oil field drilling and production tubulars at a well site to and fro between a storage facility for the tubulars and a precisely positioned wait station or pick-up point, or between any two wait stations or pick-up points, is an essential step in the remote control and hence the automation of the drilling and well completion processes. Such remote control and automation significantly increases safety at the drilling site and reduces the direct labor and therefore the cost of drilling and completing wells. This is especially true for deep oil and gas wells.

When a pipe handling boom or pipe arm such as that shown in U.S. Pat. Nos. 4,708,581, and 4,407,629 is used, it is important that a single tubular be positioned at the pick-up point, with no other tubulars next to either side of it, so that the pipe clamps of the pipe handling boom or other pick-up device can obtain a firm grasp on the tubular for lifting and rotating it into the drill string safely and accurately. This requirement makes it important that the individual tubulars of varying size be released by remote control.

It is an object of this invention to provide an improved feeding device which is usable with tubulars having a wide range of diameters, which is relatively simple and inexpensive to fabricate, and which is reliable in operation.

SUMMARY OF THE INVENTION

According to this invention, a down hole tubular feeding device is provided comprising a frame which defines a support surface for supporting a down hole tubular and first and second stops. First and second stop guides are provided, each coupled to a respective one of the stops to guide the respective stop between an upper position, in which the respective stop extends above the support surface to stop rolling movement of the down hole tubular, and a lower position, in which the respective stop is disposed below the support surface to allow rolling movement of the down hole tubular. First means are provided for moving the first and second stop guides relative to one another to select a separation dimension between the stops to accommodate the down hole tubular, and second means are provided for moving the stops in the stop guides to cycle the stops between the upper and lower positions.

Because the stop guides can be moved relative to one another to select the appropriate separation between the stops, the feeding device can readily be adjusted to function with a wide range of tubular sizes. The preferred embodiment described below automatically adjusts the stroke of the stops (i.e., the separation between the upper and lower positions of the stops) in accordance with the separation between the stop guides.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
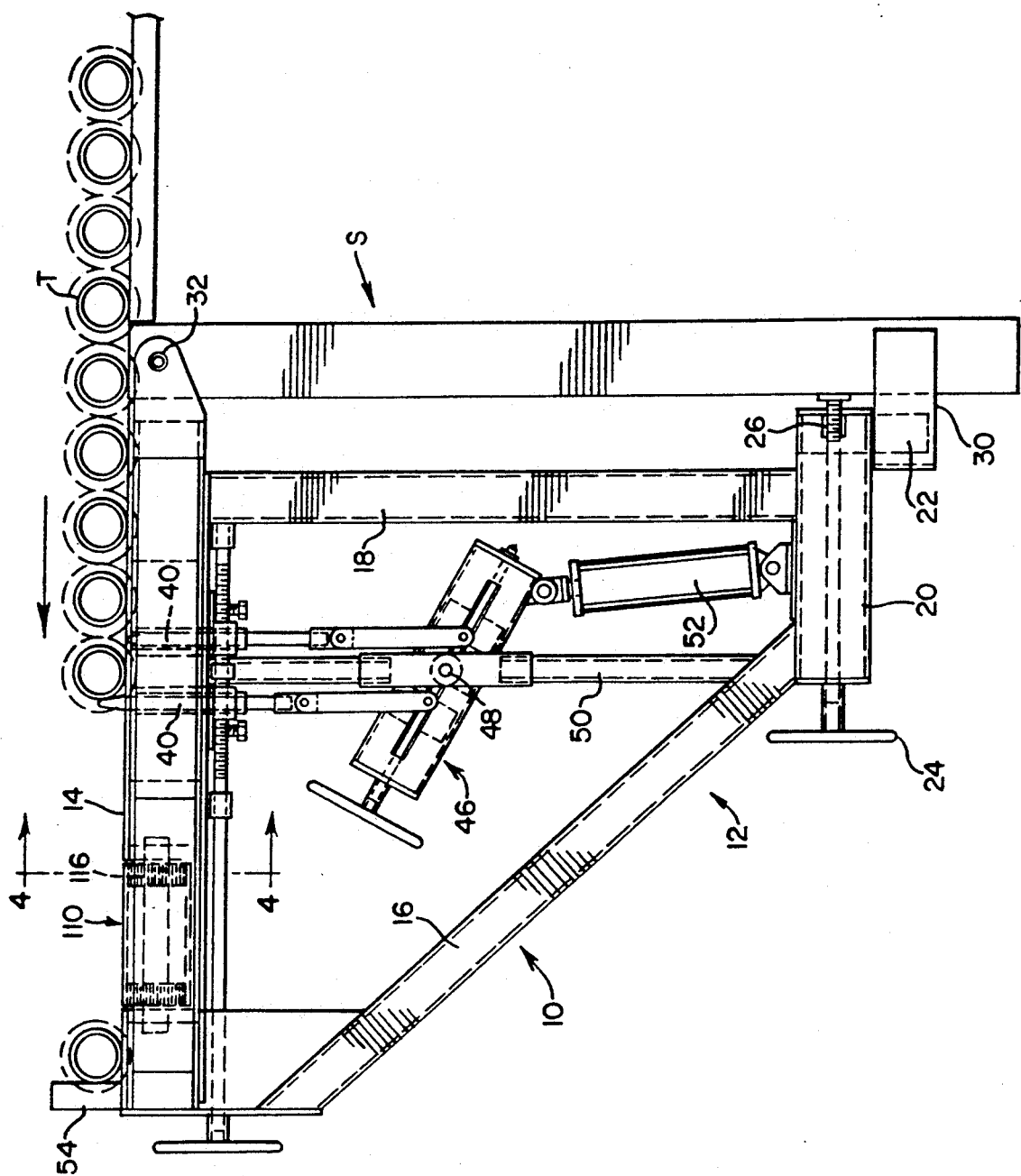
FIG. 1 is a side elevational view of a preferred embodiment of the present invention.

Turning now to the drawings, FIG. 1 shows a side elevational view of a feeding device 10 which incorporates a presently preferred embodiment of this invention. The feeding device 10 is shown attached to the side of the storage device S which stores an array of down hole tubulars T. As used herein, the term "down hole tubulars" is intended broadly to encompass drill pipe, casing, collars, production tubing and other elongated tubular elements used in well drilling and production activities. The storage device S can take any number of conventional forms, including conventional pipe racks and pipe trailers.

The feeding device 10 includes a rigid frame 12 which includes a substantially horizontal upper support surface 14 and a pair of uprights 16, 18 interposed between the support surface 14 and a substantially horizontal base 20. The base 20 supports a vertically oriented pin 22 and an adjustment wheel 24 which can be used to rotate a threaded shaft 26. The threaded shaft 26 engages a follower fixed in the base 20 such that rotation of the adjustment wheel 24 causes the threaded shaft 26 to move horizontally in the base 20.

The pin 22 is captured in a collar 30 on the storage device S. This collar 30 constrains the pin 2 against lateral motion, and allows limited motion of the pin 22 toward and away from the storage device S. The upper portion of the frame 12 is pivotably mounted to the storage device S at a hinge 32.

The adjustment wheel 24 can be used to adjust the tilt angle of the frame 12. In particular, the support surface 14 defines a first, inner end nearer the storage device S and a second, outer end farther from the storage device S. By properly positioning the adjustment wheel 24, the threaded shaft 26 can be used to raise the outer end of the support surface 14 with respect to the inner end (when it is desired to use the feeding device 10 to transfer tubulars onto the storage device S) or alternately to lower the outer end of the support surface 14 below the inner end (when it is desired to use the feeding device 10 to feed tubulars from the storage device S).

Figure 2:
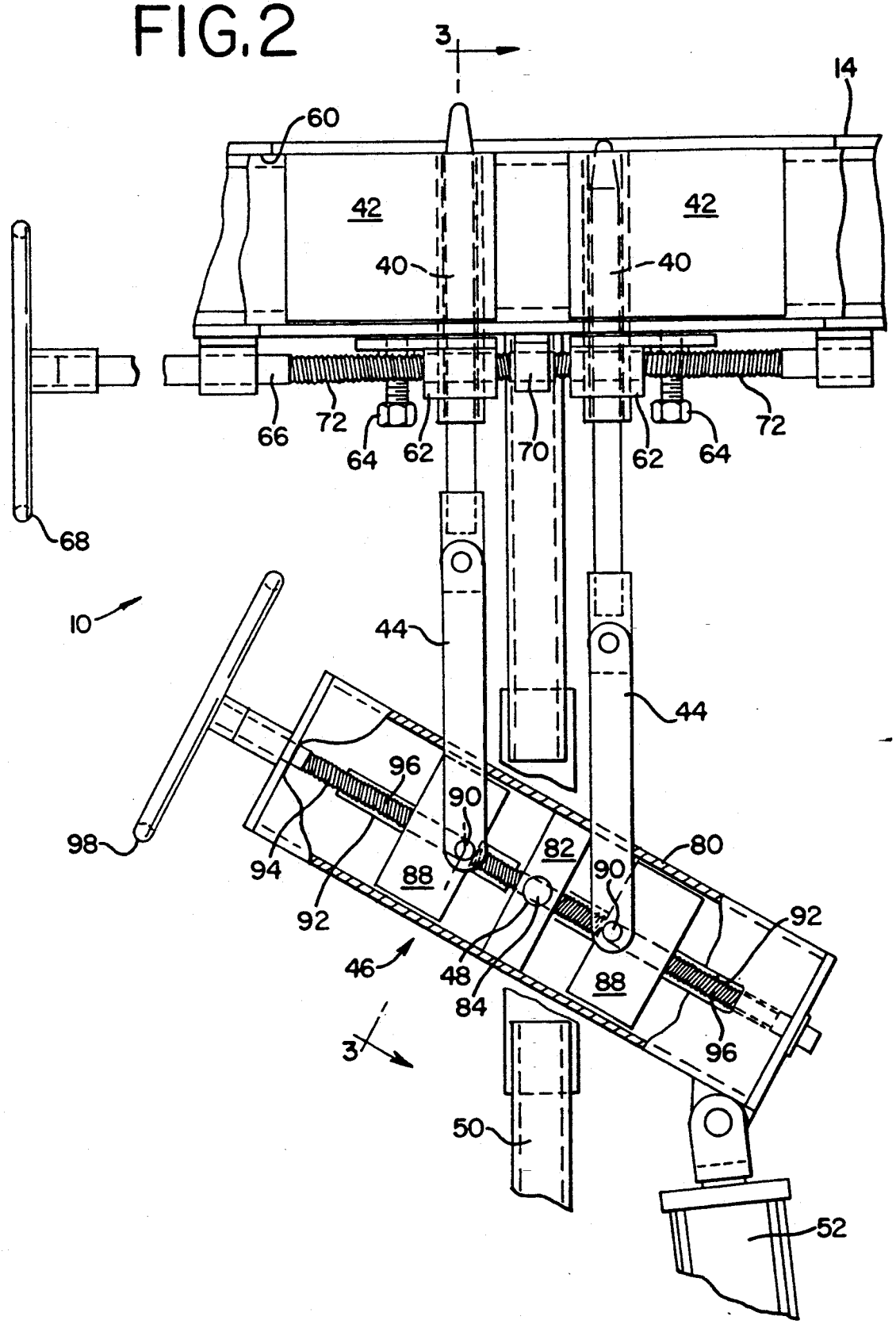
FIG. 2 is a fragmentary enlarged view in partial cutaway of the embodiment of FIG. 1.
Figure 3:
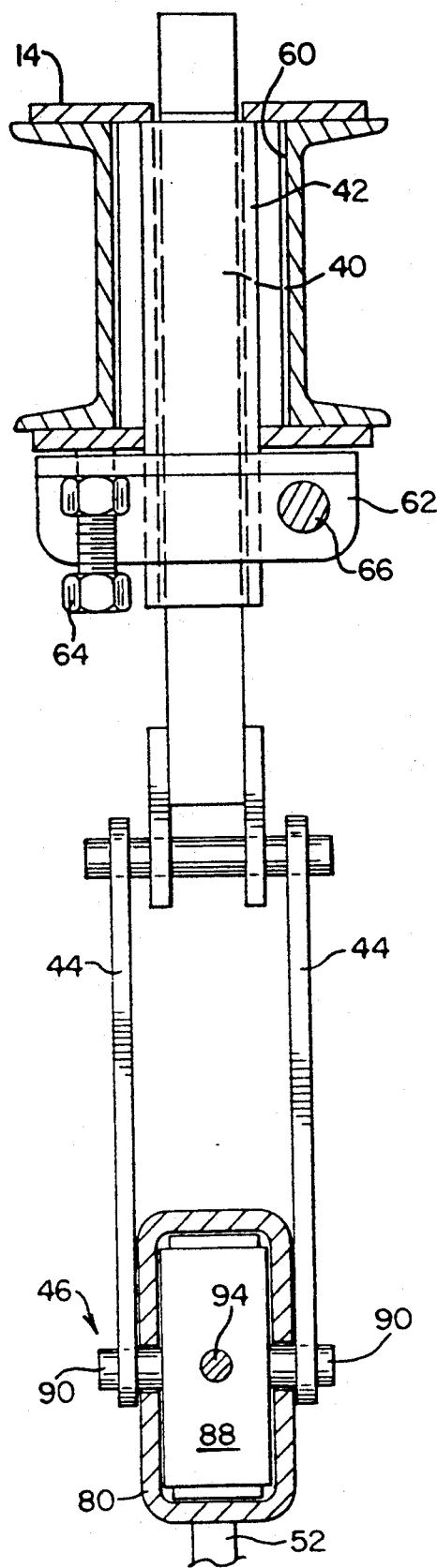
FIG. 3 is a fragmentary cross-sectional view taken along line 3—3 of FIG. 2.

As best shown in FIGS. 2 and 3, the feeding device 10 includes a pair of vertically oriented parallel stops 40 which are guided for axial movement in respective stop guides 42. Each of the stops 40 is mounted at its lower end between two links 44, which are in turn connected to an actuator arm 46. This actuator arm is mounted for pivotal movement about a tilt axis 48 with respect to the frame 12. The tilt axis 48 is rigidly positioned with respect to the frame by a support 50. An air cylinder 52 is secured between the frame 12 and the actuator arm 46. This air cylinder 52 is preferably double acting, and can be used to cycle each of the stops 40 between an upper position, in which the stop 40 extends above the support surface 14 to prevent rolling motion of a tubular T, and a lower position, in which the stop 40 is positioned below the support surface 14 to allow a tubular T to roll past the stop 40. An end stop 54 is provided at the outer end of the support surface 14 (FIG. 1).

Figure 10:
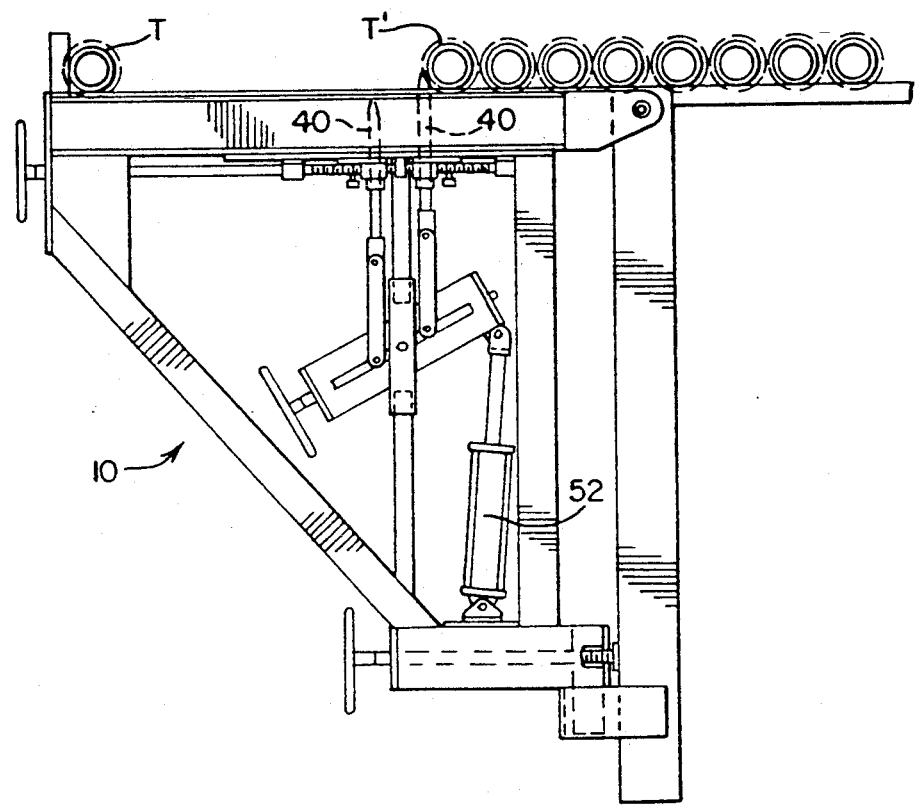
Figure 11:
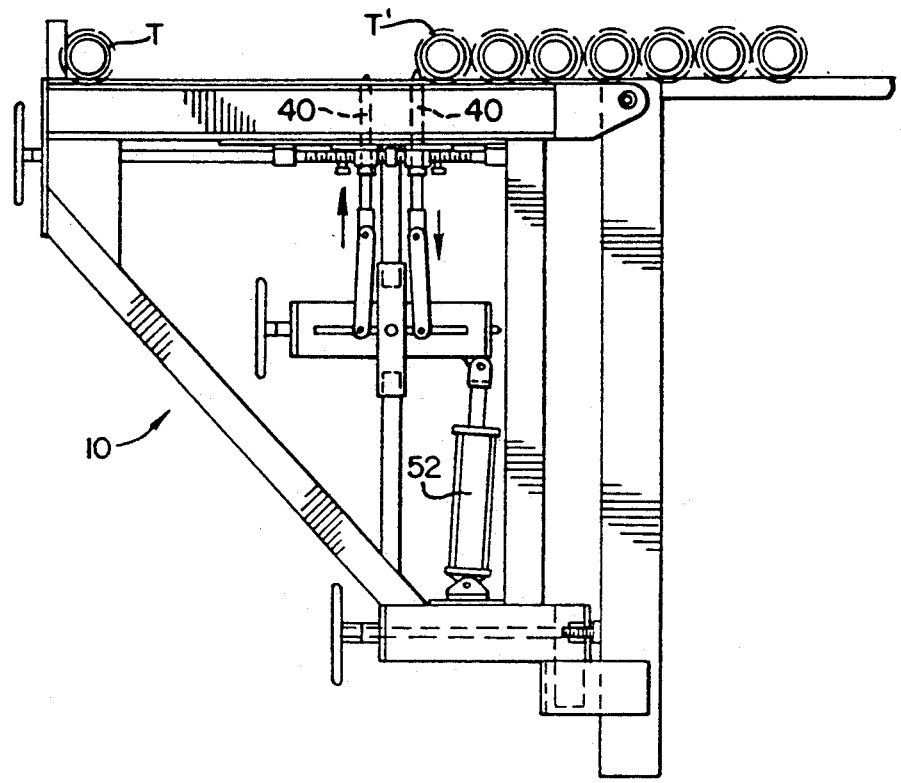
Figure 12:
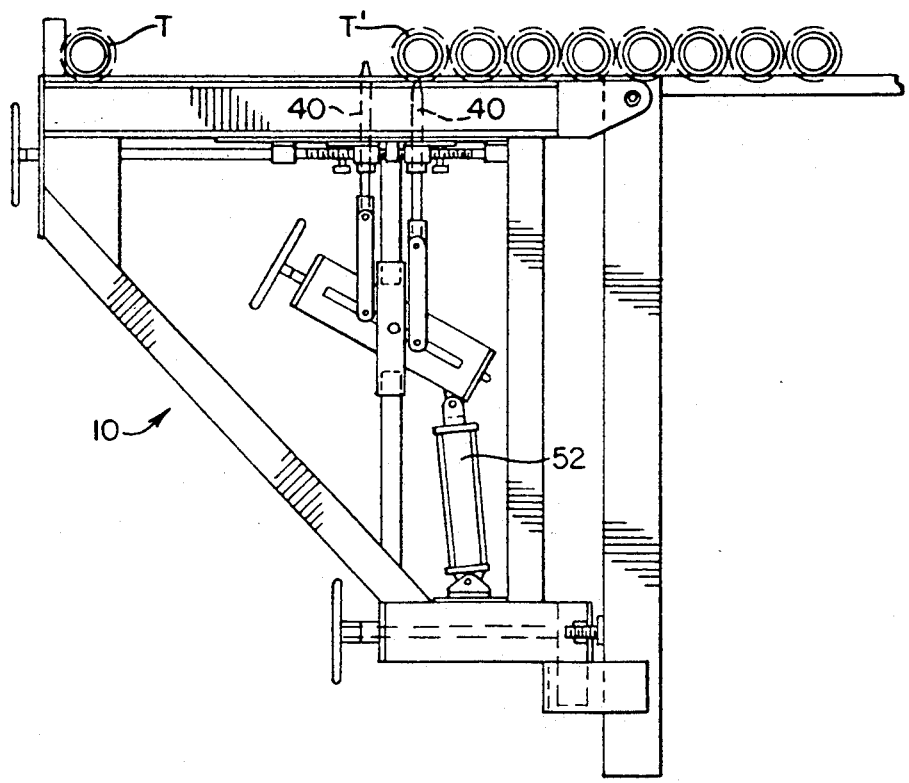

FIGS. 7 through 12 illustrate a complete cycle of the feeding device 10. Note in FIG. 7 that the air cylinder 52 is retracted, that the left stop 40 is in the upper position, and that the right stop 40 is in the lower position. As the air cylinder 52 extends (FIGS. 8 and 9), the left stop 40 is lowered and the right stop 40 is raised, thereby releasing a tubular T to roll to the end stop 54 while restraining an additional tubular T'. The cycle is completed as shown in FIGS. 10, 11 and 12 as the air cylinder 52 retracts, thereby lowering the right stop 40 and raising the left stop 40, to allow the tubular T' to roll into position in contact with the left stop 40.

Figure 5:
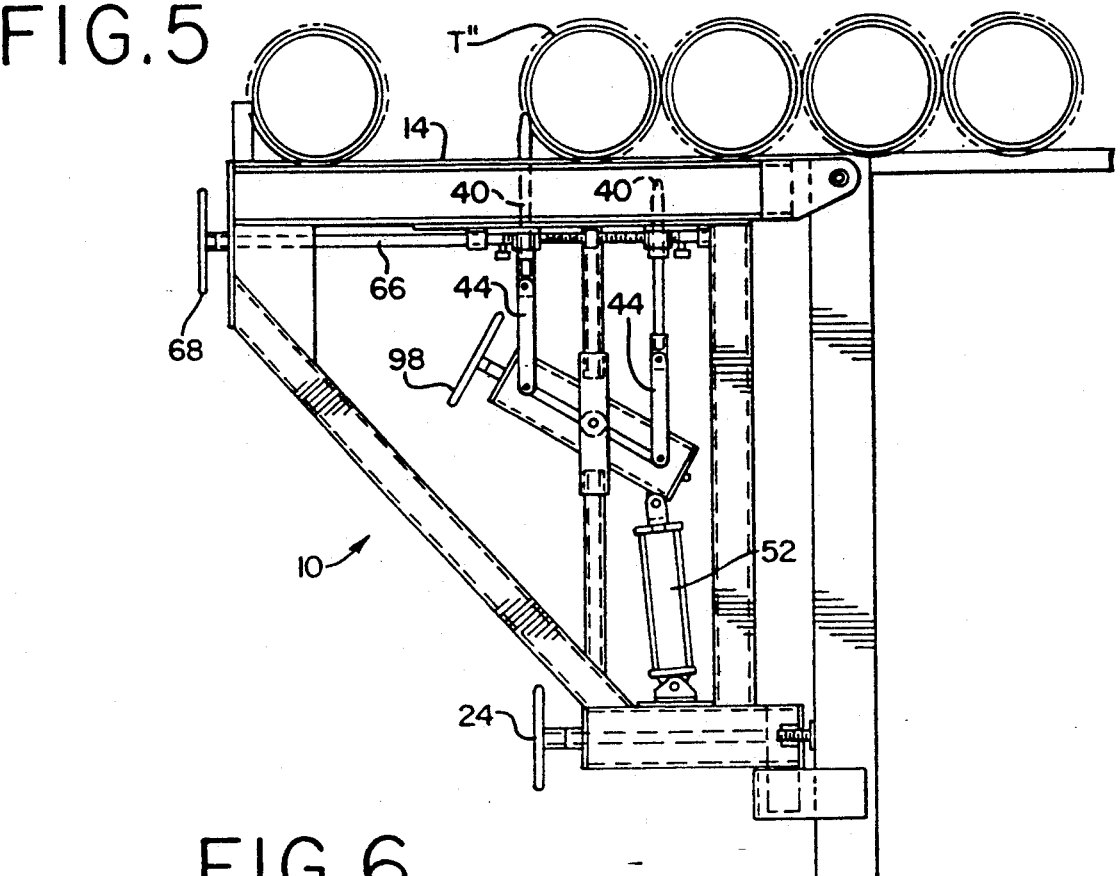
FIGS. 5 and 6 are side elevational views of the embodiment of FIG. 1 adjusted for large diameter and small diameter tubulars, respectively.
Figure 6:
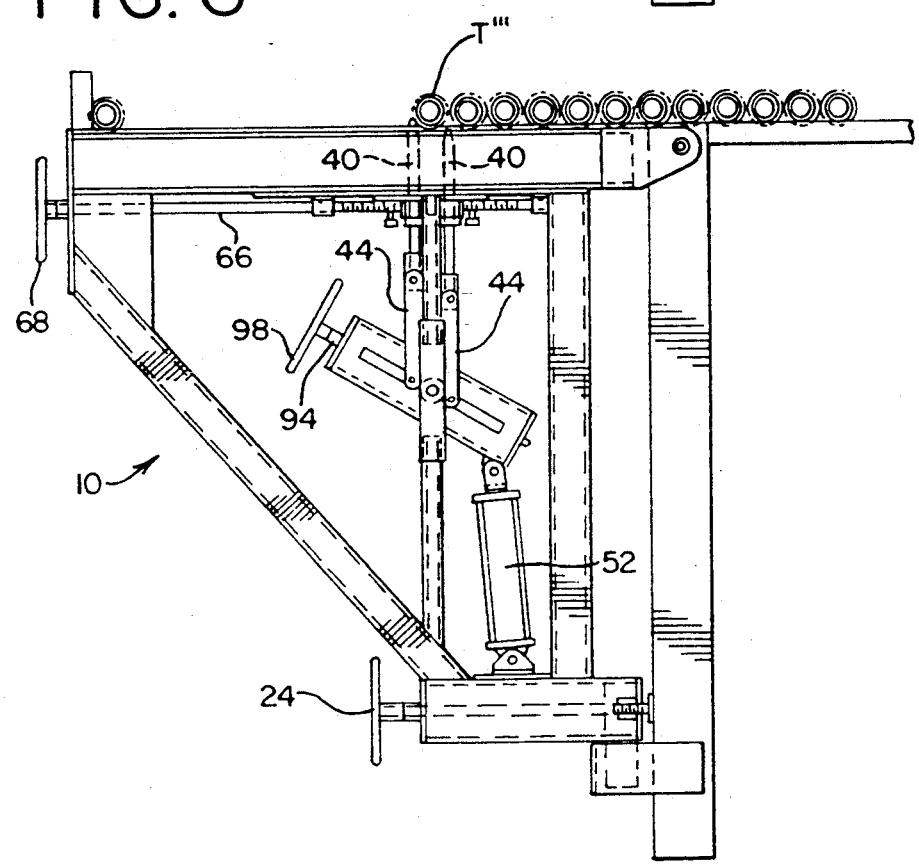
Figure 7:
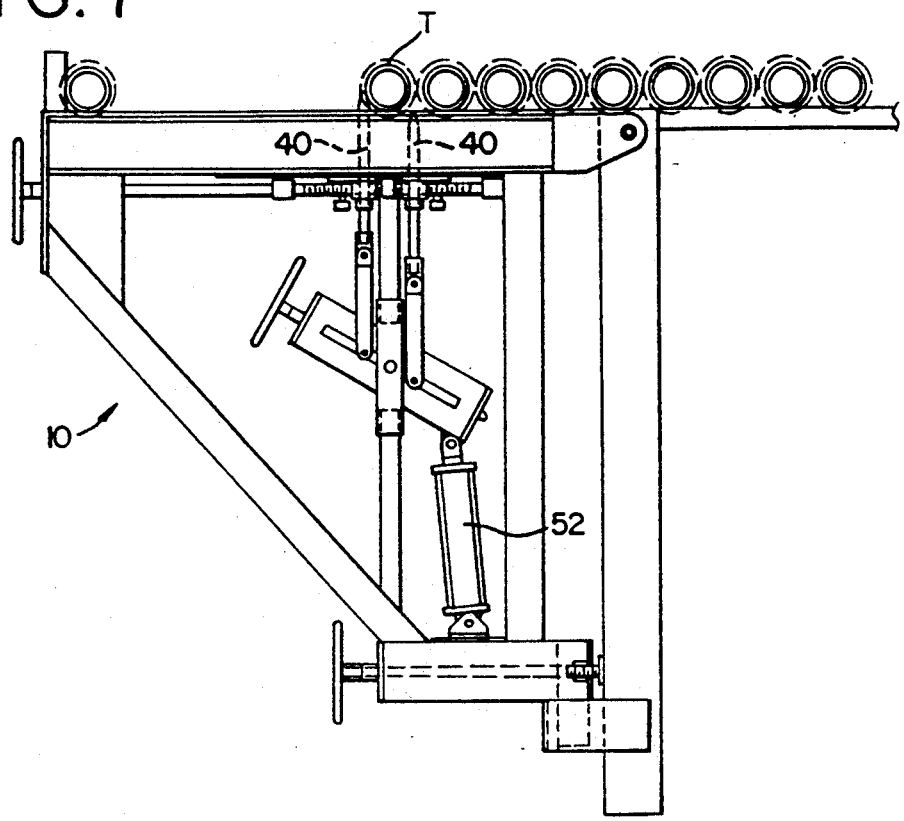
FIGS. 7 through 12 are side elevational views of the embodiment of FIG. 1 as it is cycled to position the stops alternately to the upper and lower positions.
Figure 8:
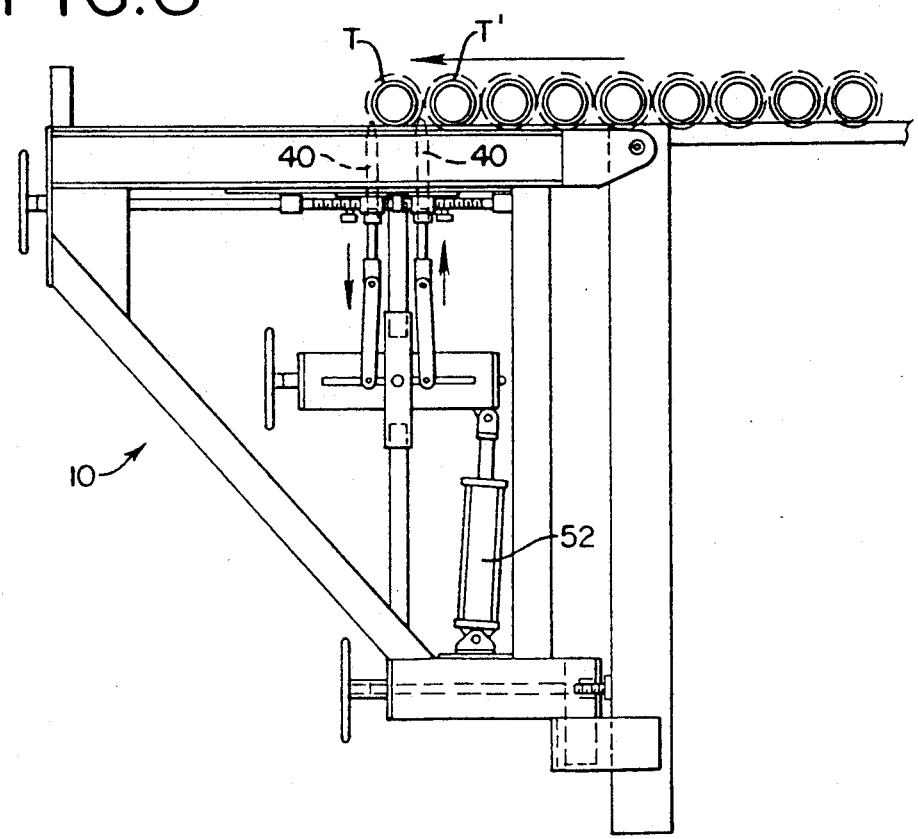
Figure 9:
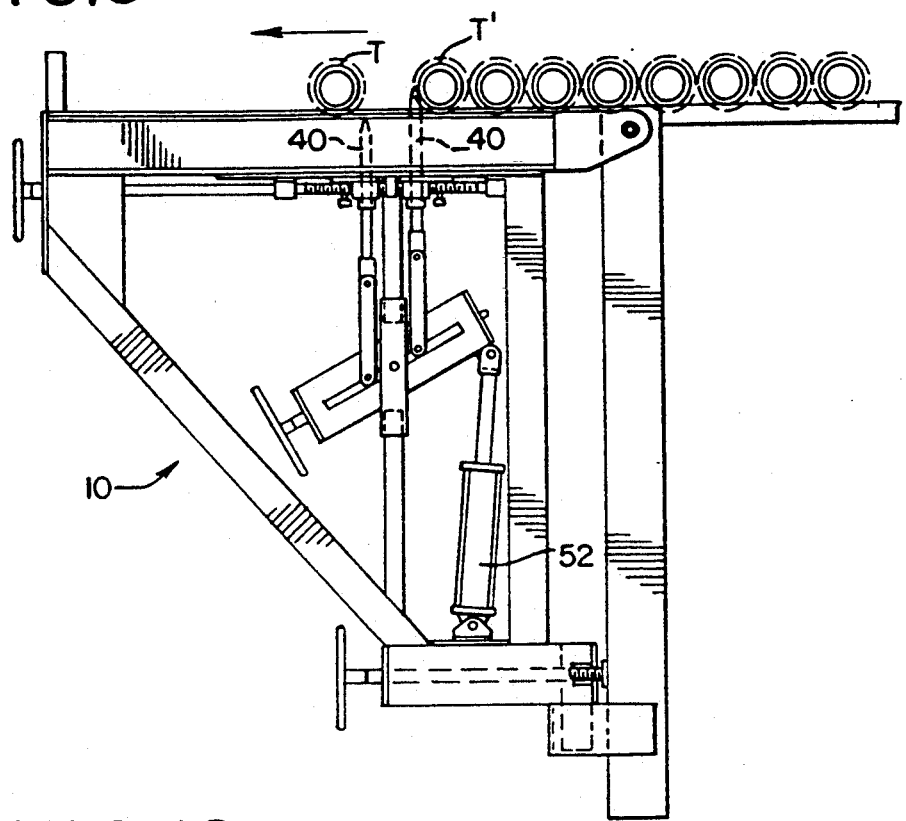

The feeding device 10 is provided with means for adjusting the separation between the two stops 40, as well as with means for adjusting the stroke of the stops 40. As shown in FIGS. 2 and 3, each of the stop guides 42 is mounted for axial movement in a channel 60. A coupler 62 is rigidly mounted on each of the stop guides 42, and each of the couplers 62 is threadedly engaged with an upper threaded rod 66. Additionally, each of the couplers 62 mounts a lock screw 64 which can be used to fix the coupler 62 and therefore the guide 42 in position in the channel 60. The upper threaded rod 66 is mounted at one end to a hand wheel 68 and is secured for rotation under the support surface 14 by a centering support 70. The upper threaded rod 66 defines two threaded portions 72, and each is threaded in a reverse sense with respect to the other. The threaded portions 72 engage threaded apertures in the couplers 62, and the hand wheel 68 can be used to rotate the upper threaded rod 66 so as to vary the separation between the stops 40. FIGS. 5 and 6 show the stops 40 adjusted at greater and lesser separations, respectively.

As shown in FIG. 2, the actuator arm 46 comprises a channel 80 which has a centering block 82 fixed therein. The centering block 82 defines two coaxial trunion pins 84 which pivotably mount the channel 80 in the support 50. The air cylinder 52 is coupled to a lower corner of the channel 80.

Also disposed within the channel 80 are two coupler blocks 88, each of which is slidable along the length of the channel 80. Each of the coupler blocks 88 defines a pair of coaxial pins 90, and the pins 90 protrude through opposed slots 92 in the channel 80. The slots 92 define the extremes of travel of the coupler blocks 88. A lower threaded rod 94 is mounted for rotation in the channel 80, and the lower threaded rod 94 defines two threaded portions 96, one on either side of the center block 82. The two threaded portions 96 are each threaded in a reverse sense with respect to the other. A hand wheel 98 is mounted to one end of the lower threaded rod 94 to allow adjustment or rotation thereof. The centering block 82 supports and centers the lower threaded rod 94. The threaded portions 96 engage threaded apertures in the coupler blocks 88, and rotation of the hand wheel 98 causes the coupler blocks 88 to move symmetrically either inwardly or outwardly with respect to the tilt axis 48.

Figure 4:
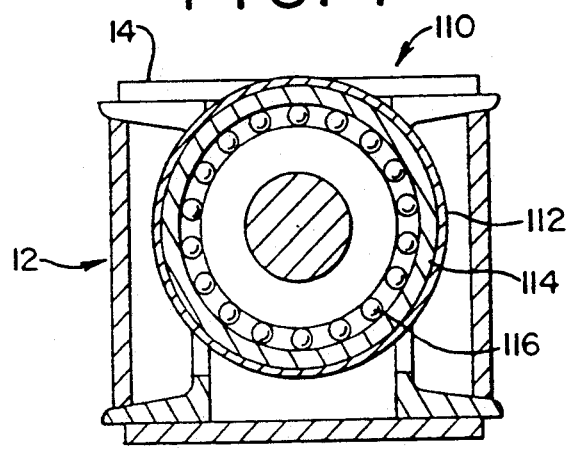
FIG. 4 is a sectional view taken along line 4—4 of FIG. 1.

As best shown in FIGS. 1 and 4, a rotatable sleeve 110 is mounted to the frame 12. This rotatable sleeve 110 includes an elastomeric tubular surface 112 positioned radially outside of a steel sleeve 114 that is supported on bearings 116. The sleeve 110 can be used for shifting tubulars axially (transverse to a line extending between the stops 40), as for example when it is desired to align one end of the tubulars with a preset reference position.

Returning to FIGS. 5 and 6, in FIG. 5 the hand wheels 68, 98 have been used to position the stops 40 for a larger diameter tubular T" and to maintain the links 44 substantially in alignment with the stops 40. Note that in this configuration the stop 40 extends substantially above the support surface 14 in the upper position, and that the stroke of the stop 40 is relatively large, as appropriate for the larger diameter tubular T".

As shown in FIG. 6, the hand wheels 68, 98 have been used to position the stops 40 near to one another as appropriate for a smaller diameter tubular T"'. Also, the links 44 are substantially in alignment with the stops 40 due to the adjustment provided by the lower threaded rod 94. Note that in this configuration the stop 40 extends to a lesser extent above the support surface 14 when in the upper position, as is appropriate for the smaller diameter tubular T"'. Thus, the disclosed system automatically adjusts the stroke of the stops 40 to maintain the stroke in proportion to the separation of the stops 40.

Typically, two of the feeding devices 10 are used together in a side by side arrangement, and the operation of the air cylinders 52 is synchronized. In this way the feeding device 10 provides for the remote control and automation of moving tubulars of varying diameters, weights, and lengths to and fro by gravity between a storage device and a wait station or pick-up point, or between two wait stations at different levels of the drill site. The adjustment wheel 24 can be used to control the direction and the speed of the tubulars as they roll across the support surface 14. When tubulars are being transferred from the storage device S, the support surface should be sloped downwardly about ¼ to ½ inch toward the end stop 54. When used in the reverse direction, the support surface 14 should be sloped toward the storage device S by one inch or so, the sharper slope being preferable to provide sufficient speed to assure that the tubular rolls all the way to its position on the pipe rack or in the pipe box. Preferably, the stops 40 are adjusted so that the space between them is equal to or slightly greater than the outside diameter of the tubular being handled.

The cylinder 52 can be activated by any suitable pressurized fluid, and either hydraulic oil or air cylinders are suitable. The cylinder is typically actuated to extend or retract by a conventional hydraulic valve, which in turn can be controlled by a solenoid in response to signals from a programmable logic controller, a computer, or any other suitable automation system including hydraulic sequencing devices, electrical relays, timers, and the like.

If desired, the feeding device 10 can be deactivated simply by removing the stops 40 from the guides 42 after disconnecting the stops 40 from the links 44.

Full automation is simplified if the tubulars are aligned with respect to each other at one end, and the sleeve 110 facilitates such alignment. An operator can manually move a heavy drill collar, joint of drill pipe, or casing axially as necessary to achieve the desired alignment.

In summary, the feeding device 10 facilitates the remote control and automation of handling operations for drilling and production tubulars in many ways. It helps assure that they are correctly positioned for insertion into the drill string with minimum distance between the lower end of the tubular and the joint or the slips, and minimum distance between the upper end of the tubular and the top drive assembly or traveling equipment, while preventing the joint from crashing either into the slips or into the top drive assembly. The feeding device 10 makes possible a fast, positive and safe remotely controlled pick-up of tubulars for transfer to the centerline of the bore hole in the mast. The feeding device 10 assures fast and accurate return of tubulars to the tubular storage device. Perhaps most important, the feeding device 10 enables full automation or remote control of all tubular handling between the tubular storage device and the means for lifting the tubular to the level of the pipe handling boom, thereby making it unnecessary for human hands to touch or even be near moving tubulars at the drill site. Finally, the feeding device 10 simplifies and lowers the cost of providing full automation and remote control for such tubular movements.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

What is claimed is:

1. A feeding device for down hole tubulars, said device comprising:
    a frame which defines a support surface for supporting a down hole tubular;
    first and second stops;
    first and second stop guides, each coupled to a respective one of the stops to guide the respective stop between an upper position, in which the respective stop extends above the support surface to stop rolling movement of the down hole tubular, and a lower position, in which the respective stop is disposed below the support surface to allow rolling movement of the down hole tubular;
    first means for moving the first and second stop guides relative to one another to select a separation dimension between the stops to accommodate the down hole tubular;
    second means for moving the stops in the stop guides to cycle the stops through a stroke between the upper and lower positions; and
    means for adjusting the stroke between the upper and lower positions, thereby adjusting the height of the upper position of the stops above the support surface.

2. A feeding device for down hole tubulars, said device comprising:
    a frame which defines a support surface for supporting a down hole tubular;
    first and second stops;
    first and second stop guides, each coupled to a respective one of the stops to guide the respective stop between an upper position, in which the respective stop extends above the support surface to stop rolling movement of the down hole tubular, and a lower position, in which the respective stop is disposed below the support surface to allow rolling movement of the down hole tubular;
    first means for moving the first and second stop guides relative to one another to select a separation dimension between the stops to accommodate the down hole tubular; and
    second means for moving the stops in the stop guides to cycle the stops between the upper and lower positions;
    wherein the first means comprises:
    an upper threaded rod which defines two threaded portions, each threaded in a reverse sense with respect to the other;
    means for mounting the upper threaded rod for rotation with respect to the frame; and
    a pair of upper couplers, each mounted to a respective one of the stop guides and coupled to a respective one of the threaded portions such that rotation of the upper threaded rod in a first direction reduces the separation dimension and rotation of the upper threaded rod in a second direction increases the separation dimension.

3. A feeding device for down hole tubulars, said device comprising:
    a frame which defines a support surface for supporting a down hole tubular;
    first and second stops;
    first and second stop guides, each coupled to a respective one of the stops to guide the respective stop between an upper position, in which the respective stop extends above the support surface to stop rolling movement of the down hole tubular, and a lower position, in which the respective stop is disposed below the support surface to allow rolling movement of the down hole tubular;
    first means for moving the first and second stop guides relative to one another to select a separation dimension between the stops to accommodate the down hole tubular; and
    second means for moving the stops in the stop guides to cycle the stops between the upper and lower positions;
    wherein the second means comprises:
    a lower threaded rod which defines two threaded portions, each threaded in a reverse sense with respect to the other;
    means for mounting the lower threaded rod to the frame for tilting movement about a tilting axis and for rotation;
    a pair of lower couplers, each mounted to a respective one of the stops and coupled to a respective one of the threaded portions of the lower threaded rod such that rotation of the lower threaded rod in a first direction brings the lower couplers closer together, and rotation of the lower threaded rod in a second direction brings the lower couplers farther apart, said lower couplers disposed on opposed sides of the tilting axis; and
    an actuator acting between the lower threaded rod and the lower threaded rod mounting means to tilt the lower threaded rod between a first tile angle, in which only the first stop is in the upper position, and a second tilt angle, in which only the second stop is in the upper position.

4. The invention of claim 1 wherein the support surface comprises:
    a rotatable sleeve mounted for rotation with respect to the frame and oriented to facilitate axial movement of the down hole tubular, transverse to a line extending between the first and second stops.

5. The invention of claim 1 wherein the support surface defines first and second ends, and wherein the invention further comprises:

means for raising and lowering the first end with respect to the second end to tilt the support surface to a desired tilt angle.

6. A feeding device for down hole tubulars, said device comprising:

a frame which defines a support surface for supporting a down hole tubular;

first and second stops;

first and second stop guides, each coupled to a respective one of the stops to guide the respective stop between an upper position, in which the respective stop extends above the support surface to stop rolling movement of the down hole tubular, and a lower position, in which the respective stop is disposed below the support surface to allow rolling movement of the down hole tubular;

an actuator coupled to the stops and operative to cycle the stops through a stroke between the upper and lower positions; and means for adjusting the stroke between the upper and lower positions, thereby adjusting the height of the upper position of the stops above the support surface.

7. The invention of claim 2 wherein the second means comprises:

a lower threaded rod which defines two threaded portions, each threaded in a reverse sense with respect to the other;

means for mounting the lower threaded rod to the frame for tilting movement about a tilting axis and for rotation;

a pair of lower couplers, each mounted to a respective one of the stops and coupled to a respective one of the threaded portions of the lower threaded rod such that rotation of the lower threaded rod in a first direction brings the lower couplers closer together, and rotation of the lower threaded rod in a second direction brings the lower couplers farther apart, said lower couplers disposed on opposed sides of the tilting axis; and an actuator acting between the lower threaded rod and the lower threaded rod mounting means to tilt the lower threaded rod between a first tilt angle, in which only the first stop is in the upper position, and a second tilt angle, in which only the second stop is in the upper position.

* * * * *